US008838372B2

(12) United States Patent
Noda

(10) Patent No.: US 8,838,372 B2
(45) Date of Patent: Sep. 16, 2014

(54) COLLISION PROBABILITY CALCULATION APPARATUS FOR VEHICLE

(75) Inventor: Kazuhiro Noda, Nagoya (JP)

(73) Assignee: Denso Corporation, Kariya (JP)

(*) Notice: Subject to any disclaimer, the term of this patent is extended or adjusted under 35 U.S.C. 154(b) by 20 days.

(21) Appl. No.: 13/461,166

(22) Filed: May 1, 2012

(65) Prior Publication Data

US 2012/0283895 A1  Nov. 8, 2012

(30) Foreign Application Priority Data

May 2, 2011 (JP) ................................. 2011-103161

(51) Int. Cl.
| | | |
|---|---|---|
| G06F 17/10 | (2006.01) | |
| G06G 7/78 | (2006.01) | |
| G08G 1/16 | (2006.01) | |
| B60W 30/09 | (2012.01) | |
| B60W 30/095 | (2012.01) | |
| B60W 30/12 | (2006.01) | |

(52) U.S. Cl.
CPC .............. *G08G 1/166* (2013.01); *B60W 30/09* (2013.01); *B60W 2520/10* (2013.01); *B60W 30/12* (2013.01); *B60W 30/0956* (2013.01); *B60W 30/0953* (2013.01); *B60W 2420/42* (2013.01)
USPC ............................ 701/301; 340/903; 382/103

(58) Field of Classification Search
USPC ............... 701/1, 301; 340/435, 903; 348/148; 382/103
See application file for complete search history.

(56) References Cited

U.S. PATENT DOCUMENTS

| | | | | |
|---|---|---|---|---|
| 6,577,334 | B1 * | 6/2003 | Kawai et al. .................. | 348/148 |
| 6,677,732 | B1 | 1/2004 | Inoue et al. | |
| 7,663,475 | B2 * | 2/2010 | Kudo ............................. | 340/435 |
| 2004/0090320 | A1 * | 5/2004 | Suzuki et al. ................. | 340/435 |

FOREIGN PATENT DOCUMENTS

| | | |
|---|---|---|
| JP | H06230115 | 8/1994 |
| JP | 4026400 | 10/1997 |
| JP | 2003-032092 | 1/2003 |
| JP | 2007-172266 | 7/2007 |
| JP | 2008-027309 | 2/2008 |

(Continued)

OTHER PUBLICATIONS

Office action dated Apr. 23, 2013 in corresponding Japanese Application No. 2011-103161.

(Continued)

*Primary Examiner* — Tuan C. To
*Assistant Examiner* — Isaac Smith
(74) *Attorney, Agent, or Firm* — Harness, Dickey & Pierce, PLC

(57) ABSTRACT

A collision probability calculation apparatus capable of accurately calculating a collision probability that one's own vehicle will collide with an object around the own vehicle (referred to as a nearby object). In the apparatus, a position of the nearby object and a traveling speed and a traveling direction of the own vehicle are acquired. A collision probability map is generated on the basis of the traveling speed and traveling direction of the own vehicle. A width of a traveling lane of the own vehicle is acquired and the map is corrected in response to the width of the traveling lane. Thereafter, a collision probability associated with the position of the nearby object is corrected in response to the position of the nearby object. The corrected collision probability is outputted as a more accurate collision probability that the own vehicle will collide with the nearby object.

8 Claims, 11 Drawing Sheets

(56) References Cited

FOREIGN PATENT DOCUMENTS

| | | | |
|---|---|---|---|
| JP | 2008027309 A | * | 2/2008 |
| JP | 2009-175957 | | 8/2009 |
| JP | 2009-271766 | | 11/2009 |
| JP | 2009271766 A | * | 11/2009 |
| JP | 2010-036648 | | 2/2010 |
| JP | 2010-030444 | | 4/2010 |
| JP | 2010-108168 | | 5/2010 |
| JP | 2010-176591 | | 8/2010 |
| JP | 2010176591 A | * | 8/2010 |

OTHER PUBLICATIONS

Office Action issued Nov. 19, 2013 in corresponding Japanese Application No. 2011-103161 (with English translation).

* cited by examiner

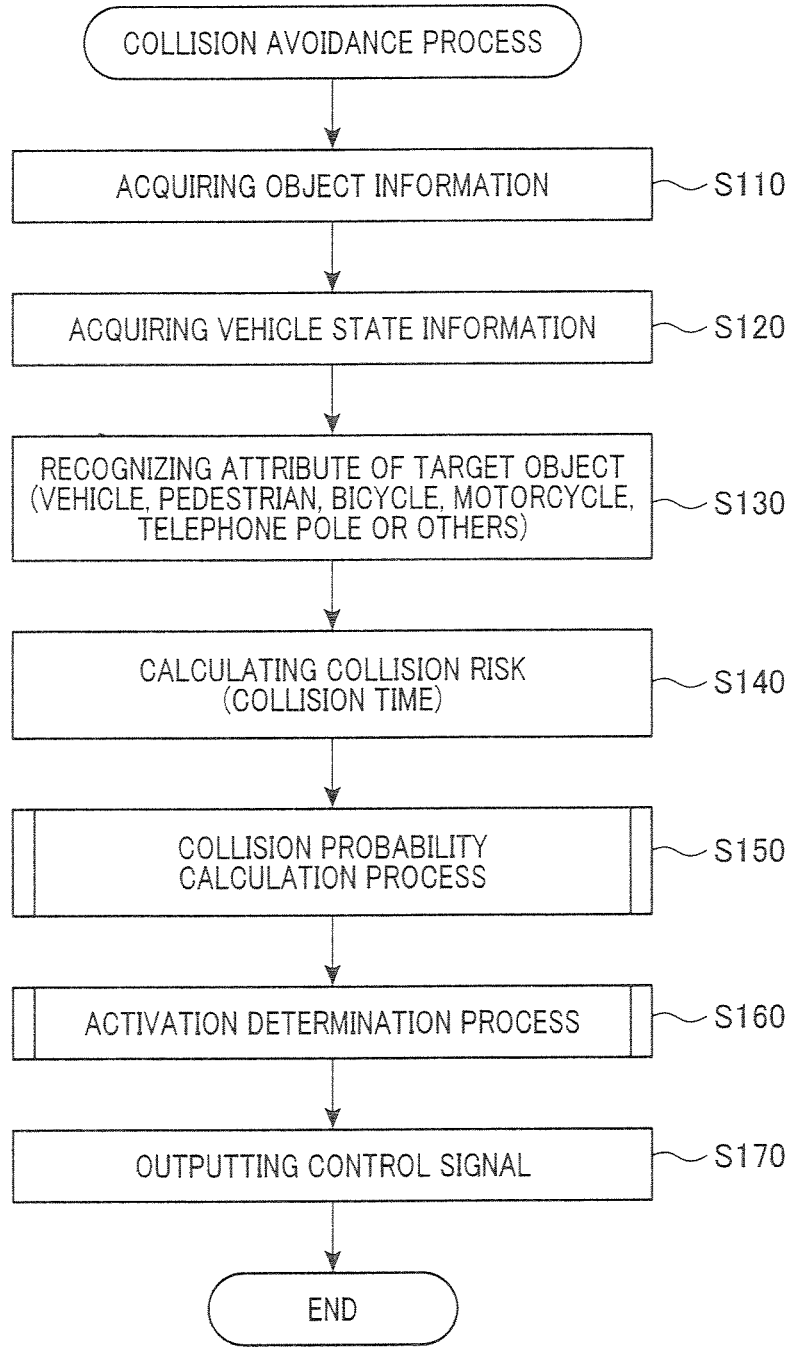

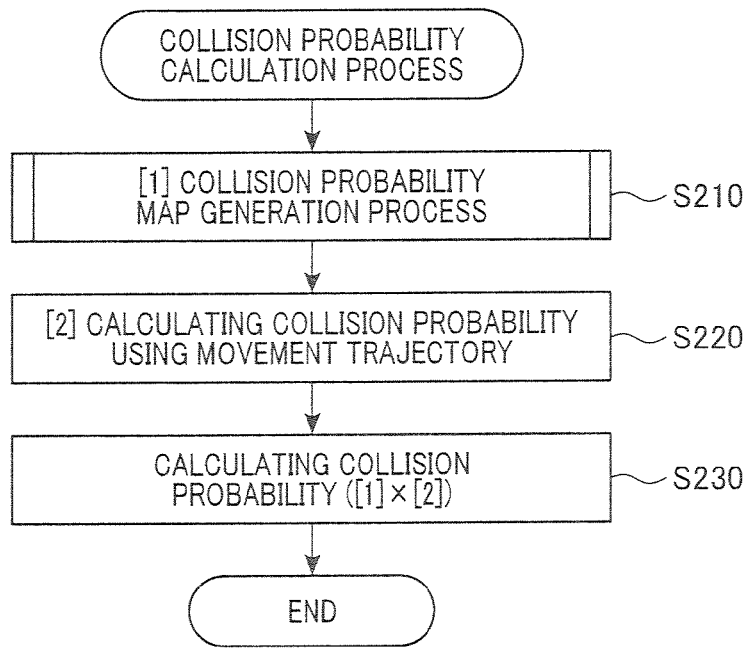
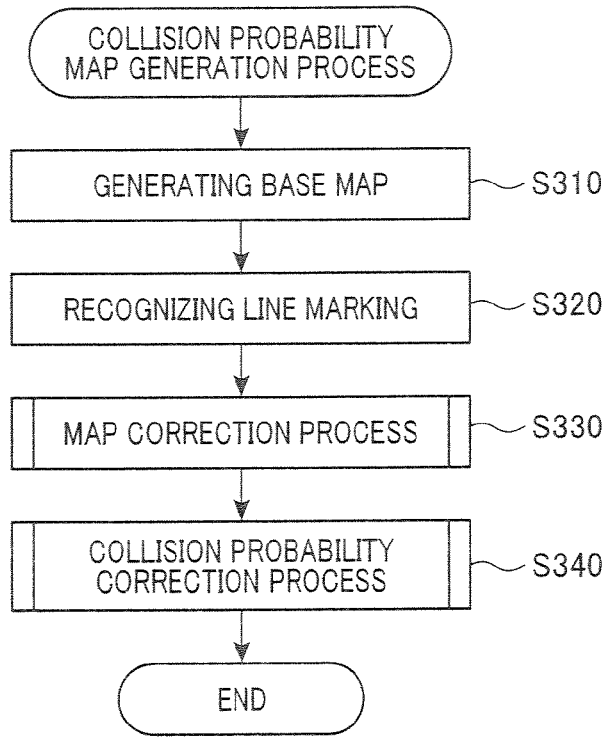

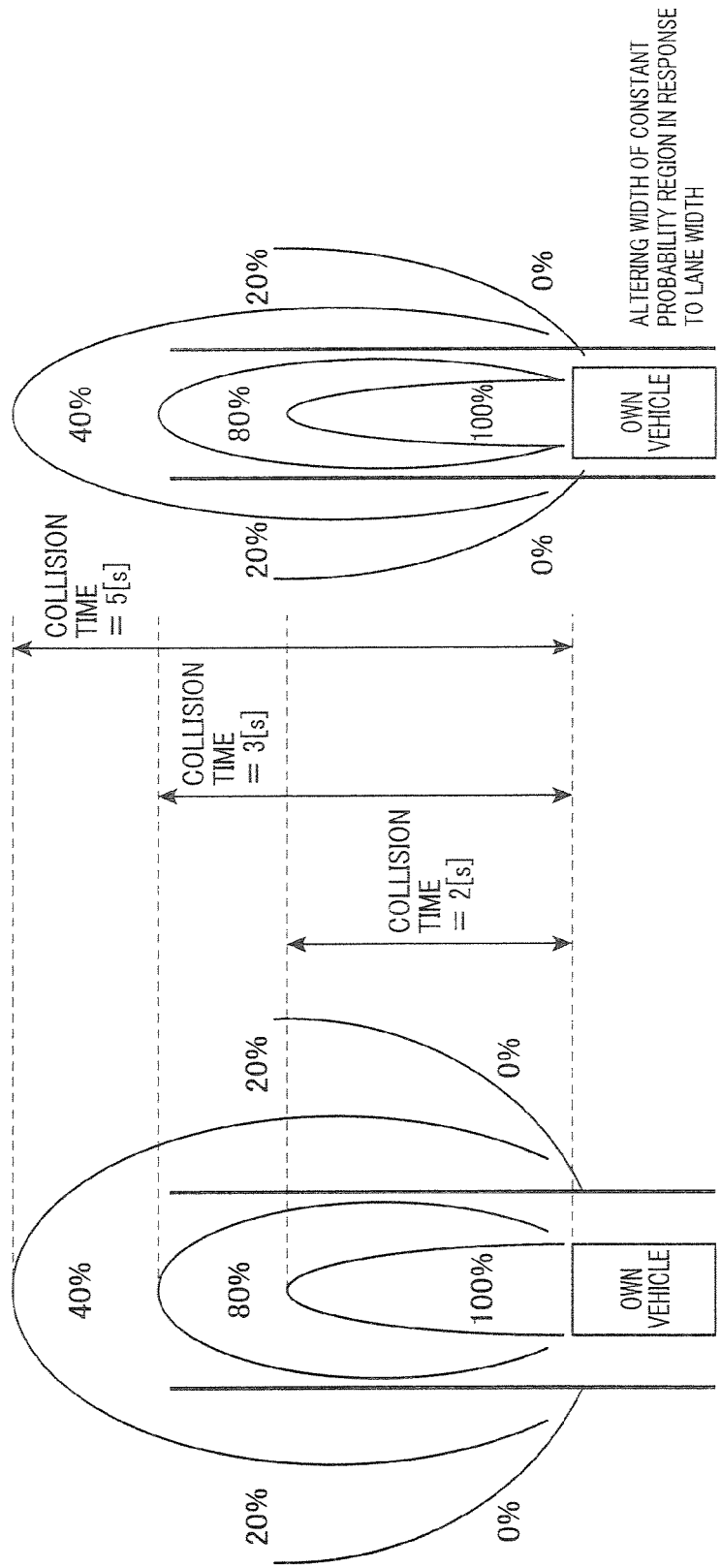

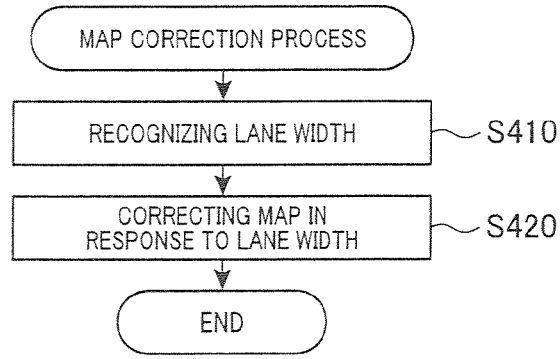
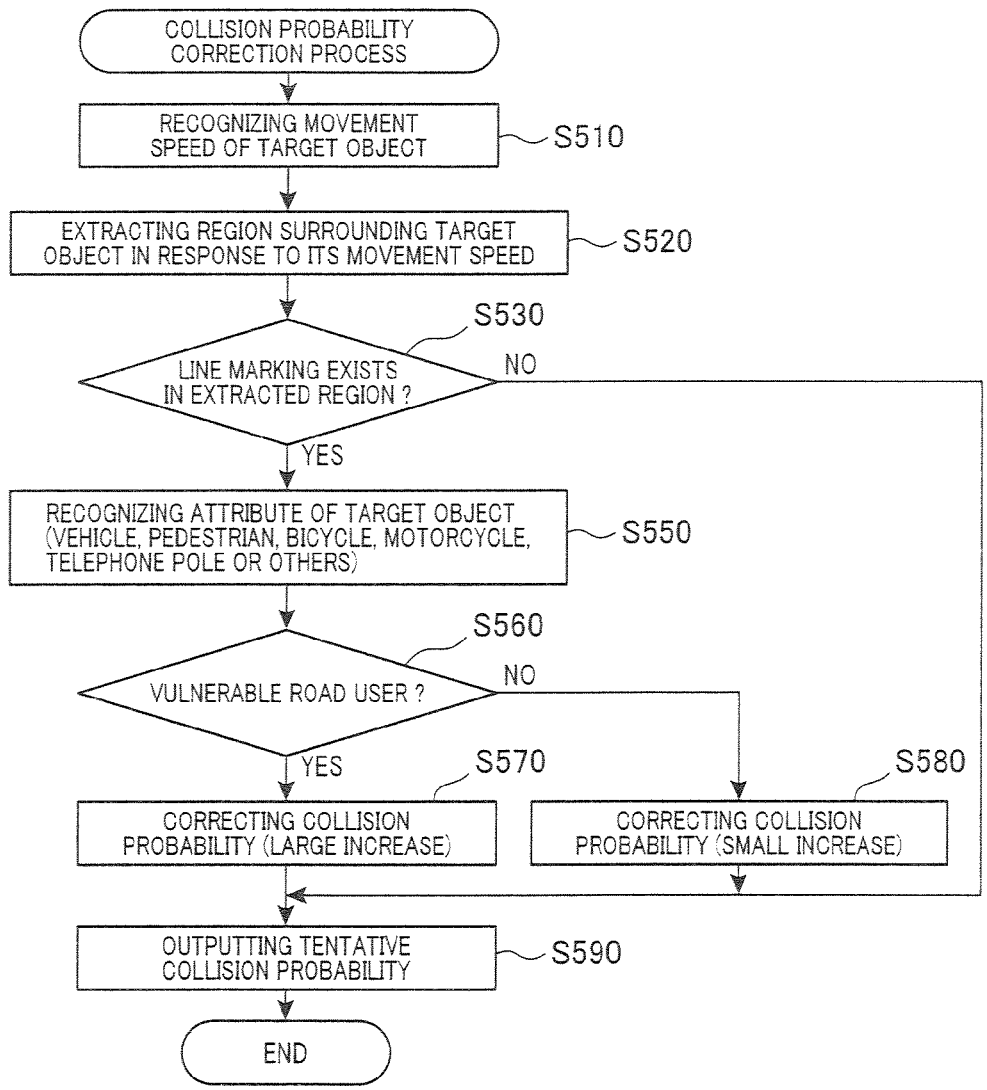

COLLISION PROBABILITY CALCULATION APPARATUS FOR VEHICLE

CROSS-REFERENCE TO RELATED APPLICATION

This application is based on and claims the benefit of priority from earlier Japanese Patent Application No. 2011-103161 filed May 2, 2011, the description of which is incorporated herein by reference.

BACKGROUND

1. Technical Field

This invention relates to a collision probability calculation apparatus for calculating a probability that one's own vehicle will collide with an object around the own vehicle, and to a collision avoidance system using the same.

2. Related Art

A known collision probability calculation apparatus for a vehicle, as disclosed in Japanese Patent No. 4026400, is operative to estimate future positions of one's own vehicle and a target object around the own vehicle, such as a pedestrian, on the basis of a current behavior of the own vehicle and a current position of the target object, and calculate a probability that the own vehicle will collide with the target object on the basis of the estimation.

However, according to techniques described in Japanese Patent No. 4026400, despite a time-varying behavior of the own vehicle, the apparatus predicts the future position of the own vehicle on the basis of the current behavior of the own vehicle, which may lead to a low accuracy of predicting the future position of the own vehicle. Therefore, the disclosed apparatus cannot calculate the collision probability accurately.

In consideration of the foregoing, exemplary embodiments of the present invention are directed to providing a collision probability calculation apparatus capable of more accurately calculating a collision probability that one's own vehicle will collide with an object around the own vehicle.

SUMMARY

According to one embodiment of the present invention, there is provided a collision probability calculation apparatus for a vehicle, including: object information acquisition means for acquiring object information including a position of an object around one's own vehicle (referred to as a nearby object); vehicle state information acquisition means for acquiring vehicle state information including a traveling speed and a traveling direction of the own vehicle; collision probability map generation means for generating a collision probability map that indicates a collision probability that the own vehicle will collide with a nearby object at each point of a region around the own vehicle, on the basis of the acquired vehicle state information.

The apparatus further includes lane width acquisition means for acquiring a width of a traffic lane in which the own vehicle is traveling (referred to as a traveling lane); collision probability distribution correction means for correcting a collision probability distribution in the collision probability map to produce a corrected collision probability map, in response to the acquired width of the traveling lane; collision probability correction means for reading a collision probability associated with the position of the nearby object from the corrected collision probability map and correcting the read collision probability in response to the acquired object information; and collision probability output means for outputting the collision probability corrected by the collision probability correction means as a more accurate collision probability that the own vehicle will collide with the nearby object.

This allows the collision probability map (that is, the collision probability distribution) to be corrected in response to a width of the traveling lane so that a collision probability that the own vehicle will collide with a nearby object residing in a region in which the own vehicle is more likely to travel is higher than a collision probability that the own vehicle will collide with a nearby object residing in a region in which the own vehicle is less likely to travel. Hence, a region in which the own vehicle is likely to travel can be recognized more accurately, which leads to more accurate calculation of collision probabilities.

According to one embodiment, there is provided a collision avoidance system for a vehicle, including: a collision probability calculation apparatus for a vehicle, comprising: object information acquisition means for acquiring object information including a position of an object around one's own vehicle, the object being referred to as a nearby object; vehicle state information acquisition means for acquiring vehicle state information including a traveling speed and a traveling direction of the own vehicle; collision probability map generation means for generating a collision probability map that indicates a collision probability that the own vehicle will collide with a nearby object at each point of a region around the own vehicle, on the basis of the acquired vehicle state information; lane width acquisition means for acquiring a width of a traffic lane in which the own vehicle is traveling, the traffic lane being referred to as a traveling lane; collision probability distribution correction means for correcting a collision probability distribution in the collision probability map to produce a corrected collision probability map, in response to the acquired width of the traveling lane; collision probability correction means for reading a collision probability associated with the position of the nearby object from the corrected collision probability map and correcting the read collision probability in response to the acquired object information; collision probability output means for outputting the collision probability corrected by the collision probability correction means as a more accurate collision probability that the own vehicle will collide with the nearby object, and vehicle control means for controlling the own vehicle to avoid a possible collision with the nearby object in response to the collision probability outputted by the collision probability output means, wherein the vehicle control means controls the own vehicle by outputting an instruction for collision avoidance control in response to the collision probability outputted by the collision probability output means.

The system further includes: a nearby-object detector that detects at least a position of an object around the own vehicle (referred to as a nearby object) and outputs the detected position of the nearby object to the apparatus; a vehicle state detector that detects at least a traveling speed and a traveling direction of the own vehicle and outputs the detected traveling speed and traveling direction of the own vehicle to the apparatus; and a collision avoidance control executor that implements collision avoidance control upon reception of the instruction for collision avoidance control from the apparatus.

In this manner a system which acts as a collision avoidance system for a vehicle according to the embodiment of the present invention may be implemented.

BRIEF DESCRIPTION OF THE DRAWINGS

In the accompanying drawings:

FIG. 2 illustrates a flowchart of a collision avoidance process;

FIG. 3A illustrates a flowchart of a collision probability calculation process of FIG. 2;

FIG. 3B illustrates a flowchart of a collision probability map generation process of FIG. 3A;

FIG. 4A illustrates an example of a base collision probability map;

FIG. 4B illustrates an example of a corrected collision probability map;

FIG. 5A illustrates a flowchart of a map correction process of FIG. 3B;

FIG. 5B illustrates a flowchart of a collision probability correction process of FIG. 3B;

DESCRIPTION OF SPECIFIC EMBODIMENTS

The present invention will be described more fully hereinafter with reference to the accompanying drawings. Like numbers refer to like elements throughout.

Figure 1A:
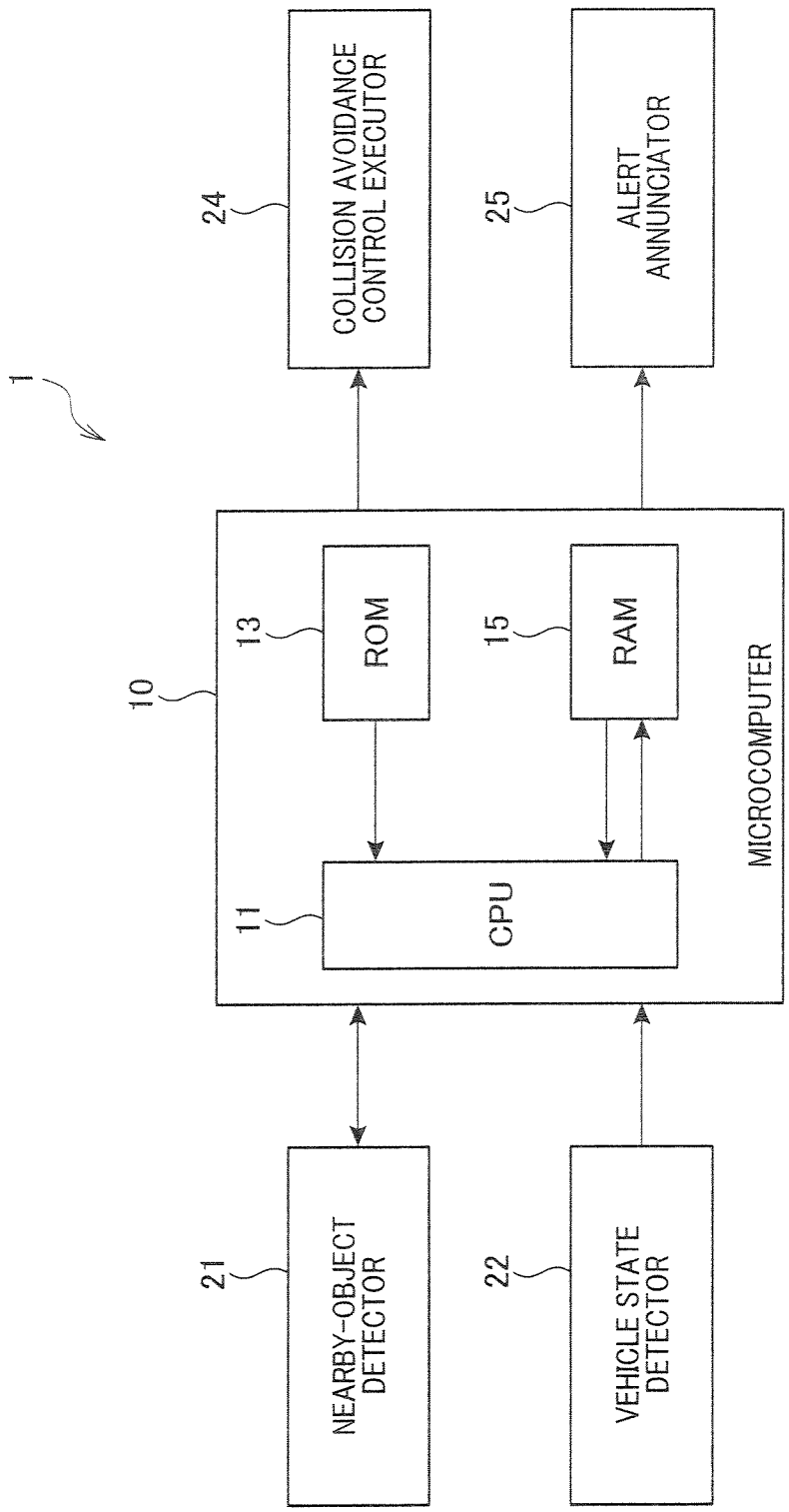
FIG. 1A schematically illustrates a block diagram of a collision avoidance system according to one embodiment of the present invention.

FIG. 1A schematically illustrates a block diagram of a collision avoidance system 1 according to one embodiment of the present invention. The collision avoidance system 1, which is mounted in a vehicle (hereinafter referred to as one's own vehicle), such as a passenger car, detects whether or not the own vehicle is at risk of colliding with an object around and outside the own vehicle (hereinafter referred also to as a nearby object). When it is determined that the own vehicle is at risk of colliding with the nearby object, the collision avoidance system 1 implements collision avoidance control and/or raises an alert. In the following, the nearby object detected in image processing or the like is referred to as a target object.

As shown in FIG. 1A, the collision avoidance system 1 includes a microcomputer 10 (a collision probability calculation apparatus), a nearby-object detector 21, a vehicle state detector 22, a collision avoidance control executor 24, and an alert annunciator 25. Alternatively, the collision avoidance system 1 may be configured to have either one of the collision avoidance control executor 24 and the alert annunciator 25.

The microcomputer 10, as well-known, includes a CPU 11, a ROM 13, a RAM 15 and others. The microcomputer 10 (CPU 11) implements various processes including a collision avoidance process (which will be described later) by using programs stored in the ROM 13, programs loaded in the RAM 15, and detection results from the nearby-object detector 21 and the vehicle state detector 22.

Figure 1B:
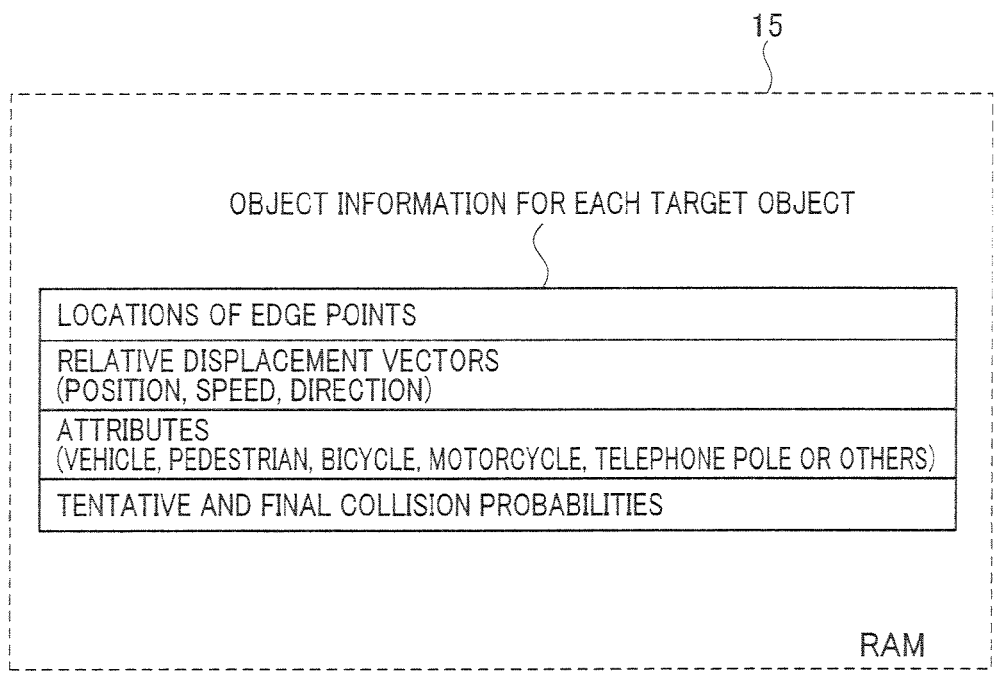
FIG. 1B illustrates object information for each target object stored in a RAM of FIG. 1A.

The nearby-object detector 21, which is equipped with a camera as means for acquiring a captured image, captures surroundings of the own vehicle (mainly in the forward direction of the own vehicle) and outputs the captured image to the microcomputer 10. The microcomputer 10 receives the captured image, detects edge points (such that each edge point is between mutually adjacent pixels having a luminance difference larger than a predetermined value) in the captured image, and stores locations of the edge points in a memory such as the RAM 15 as shown in FIG. 1B.

The nearby-object detector 21 includes, but is not limited to, a well-known radar device or a well-known sonar device or both. The radar device or the sonar device detects a relative displacement vector (a position, a speed, a direction) of the nearby object relative to the own vehicle by emitting an electromagnetic wave (such as a light wave and a radio wave) or a sound wave and receiving the reflected wave from the nearby object of the own vehicle, and outputs the detected relative displacement vector to the microcomputer 10. The microcomputer 10 stores the relative displacement vector in a memory such as the RAM 15 as shown in FIG. 1B.

The locations of the edge points and the relative displacement vector are included in object information.

The vehicle state detector 22 includes, but is not limited to, a well-known speed sensor and a well-known steering wheel angle sensor, and outputs vehicle state information including at least a traveling speed and a steering wheel angle (a traveling direction) of the own vehicle to the microcomputer 10.

The collision avoidance control executor 24 controls a hydraulic brake pressure and a tensile force of a seat belt of the own vehicle. When receiving an instruction for collision avoidance control from the microcomputer 10, the collision avoidance control executor 24 stops movement of the own vehicle or restrains the driver of the own vehicle with the seat belt to reduce or eliminate damage caused by a collision impact.

The alert annunciator 25 is equipped with a display (not shown) or a speaker (not shown) or both. When receiving an instruction for alert from the microcomputer 10, the alert annunciator 25 alerts the driver of a possible collision by displaying the alert on the display or outputting sound (including voice) from the speaker.

(Collision Avoidance Process)

There will now be explained a collision avoidance process implemented on the collision avoidance system 1 with reference to FIG. 2. FIG. 2 illustrates a flowchart of the collision avoidance process implemented by the CPU 11 in the microcomputer 10.

The collision avoidance process is started, for example, with power on of the microcomputer 10, after which the process is repeated periodically, for example, at a time interval of 100 msec.

First, in the collision avoidance process, the object information is acquired by CPU 11 using means for acquiring object information from the RAM 15 in step S110 (object information acquisition means, captured image acquisition means) and the vehicle state information is acquired by CPU 11 using means for acquiring vehicle state information from the vehicle state detector 22 in step S120 (vehicle state information acquisition means).

In the step of acquiring the object information, the locations of the edge points and the relative displacement vectors (which are detection results of the nearby-object detector 21) stored in the RAM 15 are read therefrom (see also FIG. 1B). In the step of acquiring the vehicle state information, the traveling speed and the steering wheel angle of the own vehicle (the detection result of the vehicle state detector 22) are acquired from the vehicle state detector 22.

Subsequently, an attribute of the target object is recognized in step S130 and stored in a memory such as the RAM 15 as shown in FIG. 1B. The attribute of the target object is includes in the object information. The attribute of the target object (for example, whether the target object is a vehicle, a pedestrian, a bicycle, a motorcycle, a telephone pole or others) is recognized by means of image processing, such as well-known pattern matching or the like, on the basis of the locations of edge points. In addition, a position of the target object is determined on the basis of a location and a size of the target object in the captured image.

But in the presence of the relative displacement vectors stored in the RAM 15, the position of the target object is determined by one of the relative displacement vectors. In addition, whether the target object is a stationary object or a moving object is determined by a movement speed of the target object in the step of recognizing the attribute of the target object. The movement speed of the target object can be determined on the basis of the relative displacement vector and the vehicle state information.

Subsequently, a collision risk is calculated in step S140. The collision risk is here defined by a collision time, in which the own vehicle will collide with the target object. The collision time is calculated by using the relative displacement vector or by using the traveling speed of the own vehicle and a relative distance (a distance from the own vehicle to the target object) and others. The collision risk increases with a decreasing collision time.

Thereafter, a collision probability calculation process in step S150 and an activation determination process in step S160 are implemented. A control signal on the basis of the activation determination process is outputted by CPU 11 using means for controlling the own vehicle to the collision avoidance control executor 24 or the alert annunciator 25 or both in step S170 (vehicle control means), after which the collision avoidance process is ended. The own vehicle is thus controlled by the control signal outputted in response to a collision probability.

There will now be explained the collision probability calculation process. FIG. 3A illustrates a flowchart of the collision probability calculation process in the collision avoidance process. FIG. 3B illustrates a flowchart of the collision probability map generation process in the collision probability calculation process. FIG. 5A illustrates a flowchart of a map correction process in the collision probability map generation process. FIG. 5B illustrates a flowchart of a collision probability correction process in the collision probability map generation process.

In the collision probability calculation process, as shown in FIG. 3A, the collision probability map generation process is implemented in step S210, where a collision probability map is generated which indicates a collision probability that the own vehicle will collide with a nearby object at each point of a region around the own vehicle and a collision probability at a position of a detected nearby object is outputted after some correction processes.

More specifically, as shown in FIG. 3B, a base collision probability map (hereinafter referred also to as a base map) indicative of a collision probability that the own vehicle will collide with a nearby object at each point of a region around the own vehicle is generated by CPU 11 using means for generating a collision probability map on the basis of the traveling speed and traveling direction of the own vehicle in step S310 (collision probability map generation means). That is, the base map indicates a collision probability distribution defined by the traveling speed and traveling direction of the own vehicle acquired from vehicle state detector 22.

In the base map, as shown in FIG. 4A, a front region in the forward traveling direction of the own vehicle where the own vehicle will collide with a nearby object at each point of the region in two seconds is a 100% collision probability region. A maximum width of the 100% collision probability region is set equal to a width of the own vehicle. A region just outside and surrounding the 100% collision probability region where the own vehicle will collide with a nearby object at each point of the region in three seconds is an 80% collision probability region.

Since normally a driver tends to drive in the center of a traveling lane (a lane in which the driver's own vehicle is traveling) while avoiding left and right edges of the lane, a maximum width of the 80% collision probability region is 3.0 m that is slightly smaller than a typical lane width of 3.5 m. A region just outside and surrounding the 80% collision probability region where the own vehicle will collide with a nearby object at each point of the region in five seconds is a 40% collision probability region. A region where a probability that the own vehicle will collide with a nearby object at each point of the region is extremely low is a 0% collision probability region. A region just outside and surrounding the 40% collision probability region, but surrounded by the 0% collision probability region, is a 20% collision probability region.

Subsequently, a line marking of the traveling lane of the own vehicle (such as a white or yellow, center line, lane line, or edge line marking, where the center line marking designates separation of traffic lanes flowing in opposite directions, the edge line marking designates an edge of a roadway, and the lane line marking designates separation of traffic lanes flowing in the same direction) is detected by image processing by CPU 11 using means for detecting an edge of the traveling lane, such as well-known Hough transformation, of the captured image (an edge point distribution) in step S320 (lane-edge detection means). The map correction process is implemented in step S330, where a collision probability distribution in the base map is corrected in response to a width of the traveling lane.

In the map correction process, as shown in FIG. 5A, a width of the traveling lane is detected by CPU 11 using means for acquiring a width of a traffic lane on the basis of locations of the detected line markings in step S410 (lane width acquisition means). Subsequently, the base collision probability map is corrected by CPU 11 using means for correcting a collision probability distribution in response to the detected lane width in step S420 (collision probability distribution correction means), where the base collision probability map is corrected, for example, by using a graph shown in FIG. 6, that is, a graph of correction factor vs. lane width for a maximum width of the 80% collision probability region.

Figure 6:
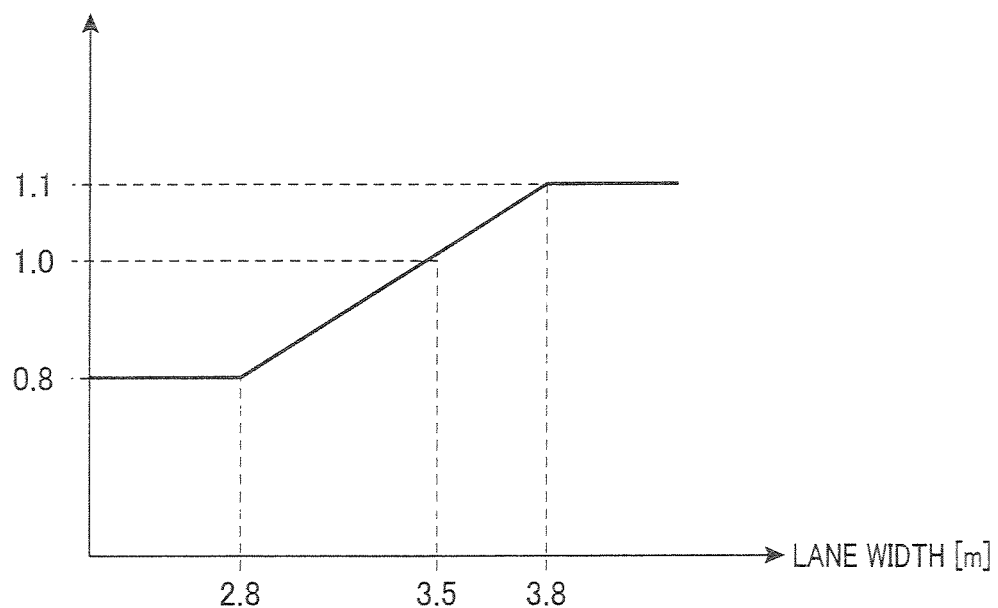
FIG. 6 illustrates an exemplary graph of correction factor vs. maximum width for an 80% collision probability region.

Referring to the graph shown in FIG. 6, the correction factor is set at 1.0 at the lane width of 3.5 m. The correction factor is set at 1.1 when the lane width is equal to or larger than 3.8 m. The correction factor is set at 0.8 when the lane width is less than 2.8 m. The correction factor is set in a range of 0.8 to 1.1 when the lane width is equal to or larger than 2.8 m and less than 3.8 m. For example, when the lane width is 2.8 m, the width of the 80% collision probability region is set at 3.0× 0.8=2.4 [m].

For each of the other collision probability regions, that is, 20%, 40% or 100% collision probability region, a similar graph to the graph in FIG. 6 can be used to correct the base collision probability map.

As can be seen in the corrected collision probability map shown in FIG. 4B, the maximum width of the 80% collision probability region is set slightly smaller than the lane width.

After all the collision probability regions are corrected in response to the detected lane width in step S420, the map correction process is ended.

Subsequently, referring again to FIG. 3B, the collision probability correction process is implemented in step S340, where when a line marking, such as a white or yellow, center line, lane line, or edge line marking, exists in the vicinity of the target object and the target object is a vulnerable road user that is likely to be harmed by the own vehicle, the collision probability in the collision probability map corrected in step S330 is further corrected to a higher value.

More specifically, as shown in FIG. 5B, a movement speed of the target object is recognized in step S510 (movement speed detection means), where the movement speed of the target object is estimated on the basis of the current and previous captured images. But in the presence of the relative displacement vectors stored in the RAM 15, the movement speed of the target object is determined by one of the relative displacement vectors.

Subsequently, a region surrounding the target object, which is centered at the target object, is extracted from the captured image by CPU 11 using means for extraction in response to the movement speed of the target object in step S520 (surrounding-region extraction means). For example, as shown in FIG. 7A, when the target object is a pedestrian, a width of an extraction region (a region to be extracted from the captured image) is increased with an increasing movement speed of the pedestrian.

Figure 7A:
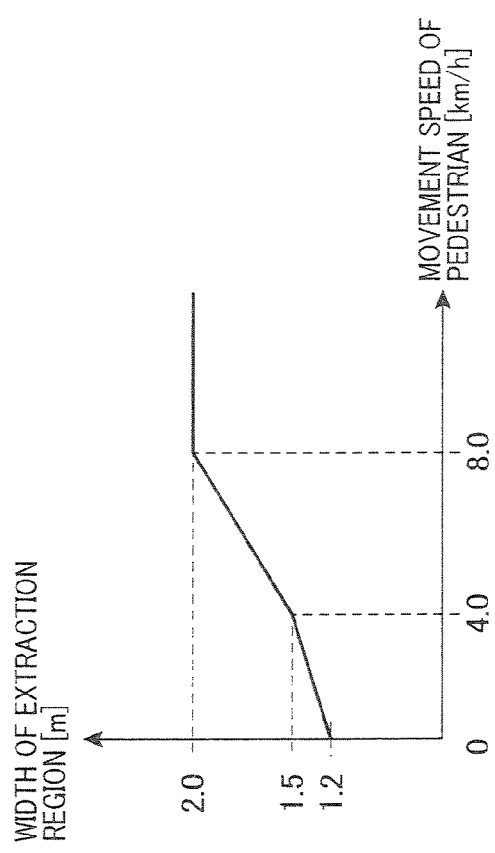
FIG. 7A illustrates an exemplary graph of width of extraction region vs. movement speed of pedestrian.
Figure 7B:
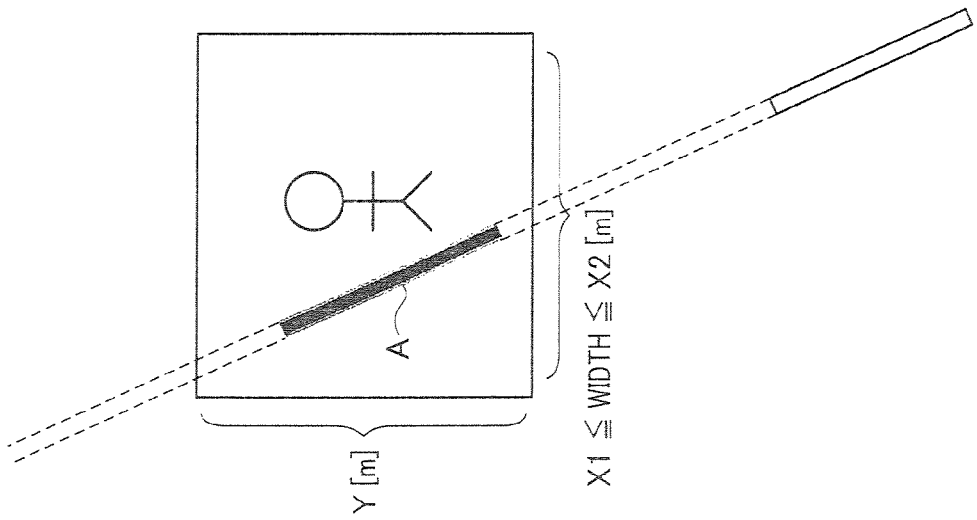
FIG. 7B illustrates an example of extracted region.

In FIG. 7A, when the pedestrian is stationary, a width of the extraction region is set at 1.2 m ("X1" in FIG. 7B). The width of the extraction region is increased with an increasing movement speed of the pedestrian. When the movement speed of the pedestrian is 4 km/h, the width of the extraction region is set at 1.5 m. For the movement speed of the pedestrian equal to or larger than 8 km/h, the width of the extraction region is kept at 2.0 m ("X2" in FIG. 7B).

A height of the extraction region ("Y" in FIG. 7B) is a fixed value, for example, 2.0 m.

Similarly, a height or a width or both of the extraction region for other kinds of target object, such as a vehicle, a pedestrian, a bicycle, a motorcycle or the like, may be variably set in response to a movement speed of the target object or may be fixed.

Subsequently, in step S530 (lane-edge presence determination means), it is determined by CPU 11 using means for determining whether or not there exists an edge of the traveling road whether or not there exists a line marking in the extracted region. As shown in FIG. 7B, if there actually exists a line marking (a solid line or the like as designated by "A") in the extracted region, or if there exists no line marking in the extracted region, but an extension (dashed line) of a line marking (a solid line or the like as denoted by "B") detected in the captured image passes through the extracted region, then it is determined that there exists a line marking in the extracted region.

If it is determined in step S530 that there exists no line marking in the extracted region, then the collision probability correction process proceeds to step S590 (which will be explained later) without correcting the collision probability. On the other hand, if it is determined in step S530 that there exists a line marking in the extracted region, then the attribute of the target object is read from the RAM 15 as shown in FIG. 1B in step S550 and it is determined by CPU 11 using means for determining whether or not the nearby object is a vulnerable road user on the basis of the attribute whether or not the target object is a vulnerable road user in step S560 (vulnerable road user determination means).

Figure 8:
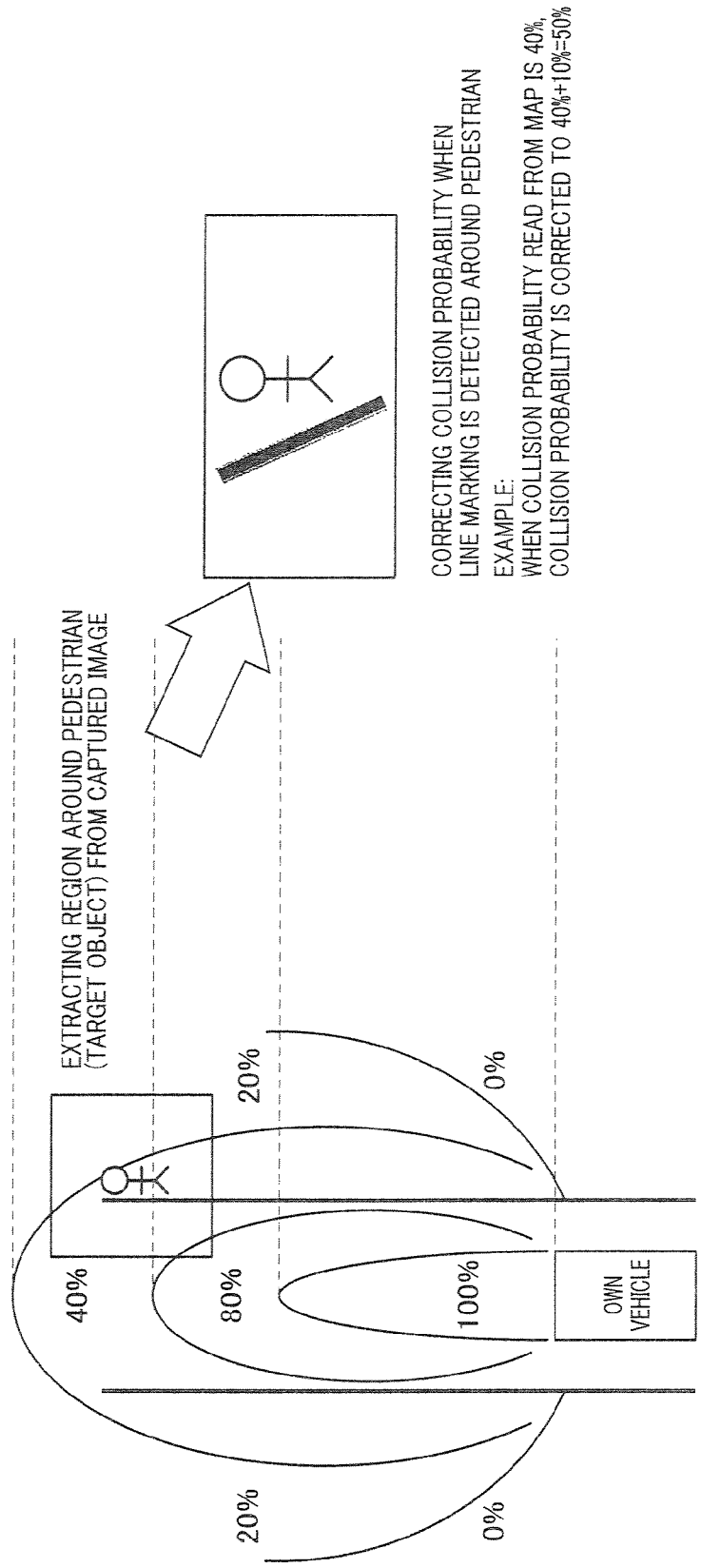
FIG. 8 illustrates an example of a collision probability correction process of FIG. 5B.

For example, when the own vehicle is a passenger car, the vulnerable road user refers to a pedestrian, a two-wheel vehicle (such as a bicycle or a motorcycle), or the like that is likely to be harmed by the own vehicle. If it is determined on the basis of the attribute of the target object that the target object is a vulnerable road user in step S560, then the collision probability is corrected to a much higher value by CPU 11 using means for reading a collision probability (a first higher value) in step S570 (collision probability correction means) and the collision probability correction process proceeds to step S590 (collision probability output means), where the corrected collision probability is outputted by CPU 11 using means for outputting the collision probability as a tentative collision probability to a memory, such as the RAM 15. In step S570, for example, as shown in FIG. 8, when a pedestrian is detected in the 40% collision probability region, the collision probability will be corrected to 50% (10% larger than 40%).

On the other hand, if it is determined on the basis of the attribute of the target object that the target object is not a vulnerable road user in step S560, then the collision probability is corrected to a slightly higher value (a second higher value lower than the first higher value) in step S580 (collision probability correction means) and the corrected collision probability is stored as a tentative collision probability in the memory such as the RAM 15 as shown in FIG. 1B in step S590 (collision probability output means). Thereafter, the collision probability correction process is ended. In step S580, for example, the collision probability is corrected to 45% (5% larger than 40%).

That is, the collision probability is acquired by applying a position of the target object on the collision probability map corrected in step S530 and the collision probability read from the map is increased (or decreased in some other embodiments) by a prescribed correction value in step S570 or S580. The resultant collision probability is stored as a tentative collision probability in the memory (such as the RAM 15) in step S590.

After step S590, the collision probability correction process is ended. At the same time, the collision probability map generation process is also ended (see FIG. 36) and the collision probability calculation process proceeds to step S220 (see FIG. 3A). In step S220, another collision probability is calculated as a function of a movement trajectory of the own vehicle and the movement speed of the target object (i.e., the relative displacement vector) in a similar manner as disclosed in Japanese Patent No. 4026400.

Thereafter, a weighted sum or a product of the collision probability calculated in step S210 and the collision probability calculated in step S220 is calculated in step S230.

The collision probability calculated in step S230 is stored as a final collision probability in a memory such as the RAM 15 as shown in FIG. 1B, after which the collision probability calculation process is ended.

Figure 9:
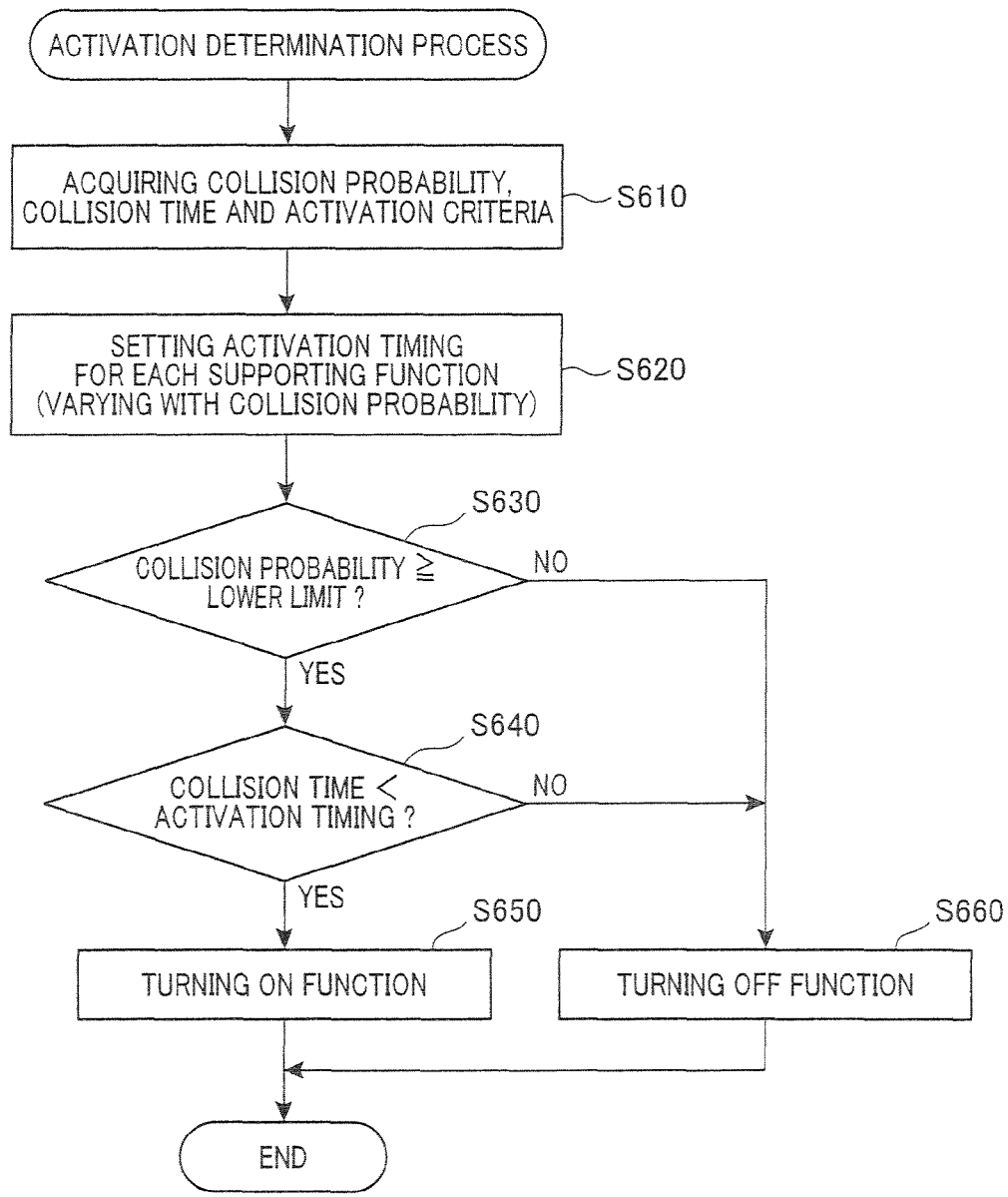
FIG. 9 illustrates a flowchart of an activation determination process of FIG. 2.

Subsequently, as shown in FIG. 2, the activation determination process is implemented in step S160. FIG. 9 illustrates a flowchart of the activation determination process, which is implemented for each of driver-supporting functions. In the present embodiment, each of the collision avoidance control executor 24 and the alert annunciator 25 is responsible for at least one driver-supporting function.

First, in the activation determination process, as shown in FIG. 9, the collision probability calculated in the collision probability calculation process, the collision time, and activation criteria preset for each of the driver-supporting functions of the collision avoidance control executor 24 and the alert annunciator 25 are acquired in step S610. Whether to activate each driver-supporting function is determined on the basis of the activation criteria for the function. The activation criteria for each driver-supporting function include, but are not limited to, a lower limit of collision probability and an upper limit of collision time for activating the driver-supporting function. For example, the lower limit of collision probability for the alert annunciator 25 is set at 50% and the lower limit of collision probability for the collision avoidance control executor 24 is set at 60%.

In addition, for example, the upper limit of collision time for the alert annunciator 25 is set at two seconds and the upper limit of collision time for a hydraulic brake pressure control function of the collision avoidance control executor 24 for raising a hydraulic brake pressure is set at 0.6 seconds.

Each of these threshold values (the lower limit of collision probability and the upper limit of collision time) may be altered to an optimal value obtained through experiments and researches. The microcomputer 10 is operative to issue an activation command (in the form of the control signal) to each of the driver-supporting functions of the collision avoidance control executor 24 and the alert annunciator 25 when the collision time decreases below its upper limit of collision time set in the activation criteria in step S170.

Figure 10:
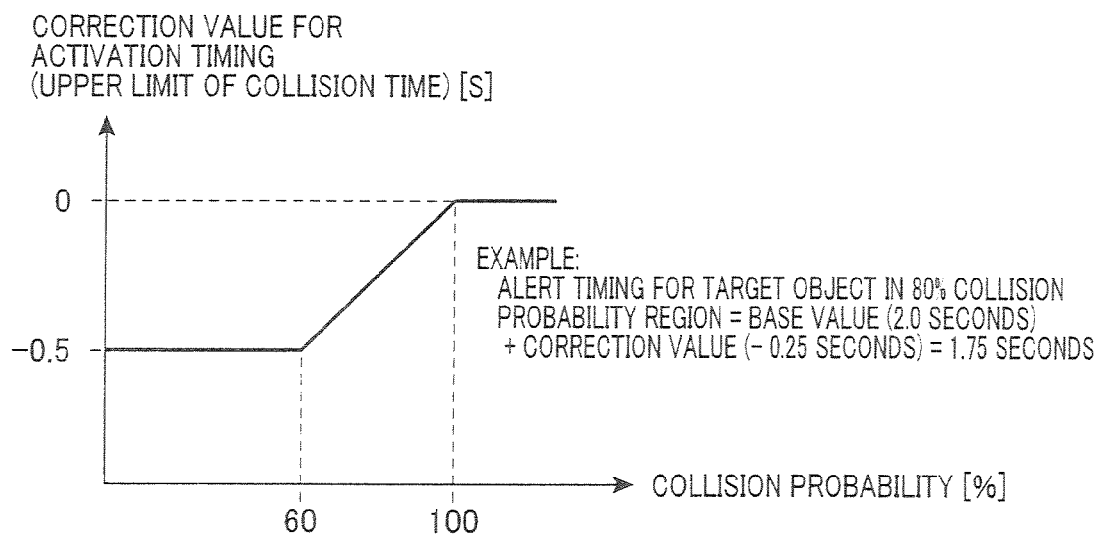
FIG. 10 illustrates an exemplary graph of activation timing correction value vs. collision probability.

Subsequently, an activation timing for each driver-supporting function is set in step S620, where the upper limit of collision time set in the activation criteria is corrected. More specifically, as shown in FIG. 10, when the collision probability is less than 60%, a correction value is set at −0.5 seconds. That is, when the collision probability is less than 60%, the upper limit of collision time set in the activation criteria (base value) is decreased by 0.5 seconds. As the collision probability increases from 60% to 100%, the correction value increases from −0.5 seconds to 0 seconds. When the collision probability reaches 100%, the correction value becomes 0 seconds.

For example, for a target object in the 80% collision probability region, the activation timing (alert timing) for triggering the alert annunciator 25 to raise an alert is set at 1.75 seconds, which is obtained by adding −0.25 seconds (a correction value read from the graph in FIG. 10) to 2.0 seconds (a base value, i.e., an alert timing set in the activation criteria). After the correction, the alert annunciator 25 will raise the alert at the alert timing of 1.75 seconds, i.e., when the collision time becomes 1.75 seconds.

It should be noted that without the correction, the alert annunciator 25 would raise the alert at the alert timing of 2.0 seconds. Therefore, the alert timing is delayed by 0.25 seconds.

Since the activation timing for the alert is delayed as the collision probability decreases, an unnecessary alert is less unlikely to be raised.

Subsequently, it is determined whether or not the collision probability that the own vehicle will collide with the target object is equal to or higher than the lower limit of collision probability set in the activation criteria in step S630 (delay control means). If the collision probability is equal to or by CPU 11 using means for delaying the start of the collision avoidance control higher than the lower limit of collision probability set in the activation criteria, then the collision time is compared with the corrected activation timing in step S640.

If it is determined in step S640 that the collision time is smaller than the corrected activation timing, then the driver-supporting function is set to its ON state in step S650, after which the activation determination process is ended. If it is determined in step S640 that the collision time is equal to or larger than the corrected activation timing or if it is determined in step S630 that the collision probability that the own vehicle will collide with the target object is lower than the lower limit of collision probability set in the activation criteria, then the driver supporting function is set to its OFF state in step S660, after which the activation determination process is ended.

(Advantages)

In the collision avoidance system 1 as described above in detail, the microcomputer 10 acquires object information including a position of an object around the own vehicle (referred to as a nearby object) and acquires vehicle state information including a traveling speed and a traveling direction of the own vehicle. The microcomputer 10 generates a collision probability map (a base collision probability map or a base map in the embodiment) that indicates a collision probability that the own vehicle will collide with a nearby object at each point of a region around the own vehicle, on the basis of the acquired vehicle state information.

The microcomputer 10 further acquires a width of a traffic lane in which the own vehicle is traveling (referred to as a traveling lane), corrects a collision probability distribution in the collision probability map (base map) to produce a corrected collision probability map, in response to the acquired width of the traveling lane, reads a collision probability associated with the position of the nearby object from the corrected collision probability map, corrects the read collision probability in response to the acquired object information, and outputs the corrected collision probability as a collision probability that the own vehicle will collide with the nearby object.

This allows the collision probability map (that is, the collision probability distribution) to be corrected in response to a width of the traveling lane so that a collision probability that the own vehicle will collide with a nearby object residing in a region in which the own vehicle is more likely to travel is higher than a collision probability that the own vehicle will collide with a nearby object residing in a region in which the own vehicle is less likely to travel. Hence, a region in which the own vehicle is likely to travel can be recognized more accurately, which leads to more accurate calculation of collision probabilities and thus to more accurate collision probabilities.

In the collision avoidance system 1 as described above in detail, the microcomputer 10 sets a width of a region in which the collision probability is constant (referred to as a constant collision probability region) so that the width of the constant collision probability region decreases with a decreasing width of the traveling lane.

It can be assumed that the own vehicle is more likely to travel in the traveling lane without departing therefrom as the width of the traveling lane decreases. Therefore, it is preferable that the width of the constant collision probability region in the collision probability map is decreased so that the own vehicle is less likely to travel outside the traveling lane. This allows the collision probability distribution in the base map to be corrected more properly in response to the width of the traveling lane.

In addition, the microcomputer 10 in the collision avoidance system 1 as described above in detail acquires a captured image of surroundings of the own vehicle, detects an edge (for example, a white or yellow, solid or dotted, line marking indicating the edge) of the traveling lane of the own vehicle from the captured image. Thereafter, the microcomputer 10 extracts a region surrounding and in the vicinity of the nearby object from the captured image and determines whether or not there exists an edge of the traveling lane of the own vehicle in the extracted region. When there exists an edge of the traveling lane of the own vehicle in the extracted region, the microcomputer 10 corrects the collision probability (read from the collision probability map corrected in response to the width of the traveling lane) that the own vehicle will collide with the nearby object to a higher value and outputs the corrected collision probability.

That is, when there exists an edge of the traveling lane in the extracted region, the collision probability read from the collision probability map corrected in response to the width of the traveling lane is corrected to a higher value. This allows the collision probability that the own vehicle will collide with a nearby object that is moving or moves in the traveling region of the own vehicle to be set higher as such a nearby object can be considered a more dangerous nearby object (a nearby object with which the own vehicle is more likely to collide).

In addition, in the collision avoidance system 1 as described above in detail, the microcomputer 10 detects a movement speed of the nearby object and alters dimensions (for example, at least one of a width and a height of a rectangular region) of a region to be extracted from the captured image (referred to as an extraction region) as a function of the movement speed of the nearby object.

That is, in the collision avoidance system 1 as described above in detail, dimensions of the extraction region are altered as a function of the movement speed of the nearby object so that an existence probability of an edge of the traveling lane in the extraction region can be altered as a function of the movement speed of the nearby object, which allows whether to facilitate altering the collision probability to be determined in response to the movement speed of the nearby object.

In the collision avoidance system 1 as described above in detail, the microcomputer 10 controls the own vehicle in response to the outputted collision probability. That is, in the collision avoidance system 1 as described above in detail, the own vehicle is controlled on the basis of the accurately calculated collision probability, which ensures that only necessary vehicle control can be implemented.

In addition, in the collision avoidance system 1 as described above in detail, the microcomputer 10 delays the start of the vehicle control when the outputted collision probability is below a predetermined threshold value.

In the collision avoidance system 1 as described above in detail, since the start of the vehicle control is delayed when the outputted collision probability is below the predetermined threshold value, the vehicle control considered unnecessary is less unlikely to be implemented.

In the collision avoidance system 1 as described above in detail, the microcomputer 10 determines whether or not the nearby object is a vulnerable road user and corrects the collision probability read from the collision probability map corrected in response to the width of the traveling lane to a higher value when it is determined that the nearby object is a vulnerable road user.

In the collision avoidance system 1 as described above in detail, since the collision probability read from the collision probability map is corrected to a higher value when the nearby object is a vulnerable road user, the corrected collision probability will be outputted such that more driver's attention can be directed to the vulnerable road user.

Other Embodiments

There will now be explained some other embodiments of the present invention that may be devised without departing from the spirit and scope of the present invention.

In the above embodiment, brake control is implemented through the collision avoidance control executor 24 and an alert is raised through the alert annunciator 25 in response to the collision probability. Alternatively, to avoid collision of the own vehicle with a nearby object in a higher collision probability region, steering control for altering a traveling direction of the own vehicle or take-up control for taking up a seat belt may be implemented.

In the above embodiment, it has been assumed that a roadway on which the own vehicle is traveling is straight. Alternatively, a roadway on which the own vehicle is traveling may be curved. In the case of a curved roadway, the collision probability distribution may be corrected in conformation to a curvature radius of the roadway.

A road shape, as well as the lane width, may also be recognized and the collision probability may be corrected so that the collision probability can take a maximum value in the center of the road.

With this configuration, even in the case of a curved roadway, the collision probability may be acquired properly.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A collision probability calculation apparatus for a vehicle, comprising:
    means for acquiring object information including a position of an object around one's own vehicle, the object being referred to as a nearby object;
    means for acquiring vehicle state information including a traveling speed and a traveling direction of the own vehicle;
    means for generating a collision probability map that indicates a collision probability that the own vehicle will collide with a nearby object at each point of a region around the own vehicle, on the basis of the acquired vehicle state information;
    means for acquiring a width of a traffic lane in which the own vehicle is traveling, the traffic lane being referred to as a traveling lane;
    means for correcting a collision probability distribution in the collision probability map to produce a corrected collision probability map, in response to the acquired width of the traveling lane;
    means for reading a collision probability associated with the position of the nearby object from the corrected collision probability map and correcting the read collision probability in response to the acquired object information; and
    means for outputting the collision probability corrected by the reading means as a more accurate collision probability that the own vehicle will collide with the nearby object;
    means for acquiring a captured image of surroundings of the own vehicle;
    means for detecting a movement speed of the nearby object, the movement speed of the nearby object being included in the object information of the nearby object;
    means for extracting a region surrounding and in the vicinity of the nearby object from the captured image, the extracting means being configured to alter dimensions of a region to be extracted from the captured image as a function of the movement speed of the nearby object;

means for detecting an edge of the traveling lane of the own vehicle from the captured image;

means for determining whether or not there exists an edge of the traveling lane of the own vehicle in the extracted region;

wherein the reading means corrects the read collision probability to a higher value when it is determined by the determining means that there exists an edge of the traveling lane of the own vehicle in the extracted region in the vicinity of the nearby object.

2. The apparatus of claim 1, wherein
the correcting means sets a width of a region on which the collision probability is constant so that the width of the constant collision probability region decreases with a decreasing width of the traveling lane.

3. The apparatus of claim 1, further comprising:
means for determining whether or not the nearby object is a vulnerable road user that is likely to be harmed by the own vehicle,
wherein the reading means corrects the read collision probability to a first higher value when it is determined by the means for determining whether or not there exists an edge of the traveling lane of the own vehicle in the extracted region in the vicinity of the nearby object and it is determined by the means for determining whether or not the nearby object is a vulnerable road user that is likely to be harmed by the own vehicle and corrects the read collision probability to a second higher value lower than the first higher value when it is determined by the means for determining whether or not there exists an edge of the traveling lane of the own vehicle in the extracted region in the vicinity of the nearby object and it is determined by the means for determining whether or not the nearby object is not a vulnerable road user that is likely to be harmed by the own vehicle.

4. The apparatus of claim 1, further comprising:
means for controlling the own vehicle to avoid a possible collision with the nearby object in response to the collision probability outputted by the outputting means.

5. The apparatus of claim 4, further comprising:
means for delaying the start of the collision avoidance control in response to the collision probability outputted by the outputting means.

6. The apparatus of claim 1, wherein the means for acquiring the width of the traffic lane in which the own vehicle is traveling acquires the width of the traveling lane on the basis of locations of edges detected by the means for detecting the edge of the traveling lane.

7. The apparatus of claim 1, wherein
the dimensions of the extraction region includes a height and a width of the extraction region, the height of the extraction region being a length of the extraction region along the traveling direction of the vehicle and the width of the extraction region being a length of the extraction region along a direction perpendicular to the traveling direction of the vehicle, and
the extracting means increases the width of the extracted region with an increasing movement speed of the nearby object.

8. The apparatus of claim 1, wherein the extracting means alters dimensions of the region to be extracted from the captured image as a function of only the movement speed of the nearby object.

* * * * *